United States Patent
Kumawat et al.

(10) Patent No.: US 12,386,815 B2
(45) Date of Patent: Aug. 12, 2025

(54) METHOD AND SYSTEM FOR DYNAMIC ADDITION OF BLOCKS IN A BLOCKCHAIN

(71) Applicant: MASTERCARD INTERNATIONAL INCORPORATED, Purchase, NY (US)

(72) Inventors: Jaipal Singh Kumawat, Rajasthan (IN); Chandan Garg, Haryana (IN); Ankur Arora, New Delhi (IN)

(73) Assignee: MASTERCARD INTERNATIONAL INCOPORATED, Purchase, NY (US)

( * ) Notice: Subject to any disclaimer, the term of this patent is extended or adjusted under 35 U.S.C. 154(b) by 21 days.

(21) Appl. No.: 17/508,187

(22) Filed: Oct. 22, 2021

(65) Prior Publication Data

US 2023/0128039 A1    Apr. 27, 2023

(51) Int. Cl.
*G06F 16/23* (2019.01)

(52) U.S. Cl.
CPC .............................. *G06F 16/2379* (2019.01)

(58) Field of Classification Search
CPC .................................................. G06F 16/2379
See application file for complete search history.

(56) References Cited

U.S. PATENT DOCUMENTS

| | | | | |
|---|---|---|---|---|
| 6,098,053 A * | 8/2000 | Slater | ................... | G06Q 20/204 705/35 |
| 11,663,090 B2 * | 5/2023 | Davis | ................... | H04L 9/3239 707/685 |
| 11,797,604 B1 * | 10/2023 | Nagalla | ............... | G06F 16/2379 |
| 12,118,537 B2 * | 10/2024 | Ravinathan | .......... | G06Q 20/204 |
| 2005/0114883 A1 * | 5/2005 | Nagai | .................... | G07F 19/201 725/35 |
| 2006/0282281 A1 * | 12/2006 | Egetoft | .................. | G06Q 10/06 712/28 |
| 2010/0019740 A1 * | 1/2010 | Hashimoto | ............... | H02P 9/48 700/286 |
| 2010/0274866 A1 * | 10/2010 | Hammad | ............... | G06Q 40/12 709/207 |
| 2014/0279513 A1 * | 9/2014 | Dodds-Brown | ... | G06Q 20/4016 705/44 |

(Continued)

FOREIGN PATENT DOCUMENTS

GB            2608844 A  *  1/2023  ........... G06F 16/219

*Primary Examiner* — Sherief Badawi
*Assistant Examiner* — Jessica N Le
(74) *Attorney, Agent, or Firm* — Panitch Schwarze Belisario & Nadel LLP (57) ABSTRACT

A method for dynamic selection of transactions for inclusion in new blocks added to a blockchain includes: receiving, by a blockchain node in a blockchain network that manages a blockchain, a plurality of proposed transactions; sorting, by the blockchain node, each proposed transaction into one of a plurality of transaction groups; identifying, by the blockchain node, a selection of proposed transactions based on one or more dynamic selection criteria, where the selection of proposed transactions includes one or more proposed transactions from one or more of the plurality of transactions groups based on the one or more dynamic selection criteria; generating, by the blockchain node, a new block including a new block header and the identified selection of proposed transactions; and distributing, by the blockchain node, the generated new block to a plurality of additional nodes included in the blockchain network.

12 Claims, 5 Drawing Sheets

(56) References Cited

U.S. PATENT DOCUMENTS

| | | | | |
|---|---|---|---|---|
| 2017/0286951 | A1* | 10/2017 | Ignatchenko | G06Q 20/3823 |
| 2017/0357966 | A1* | 12/2017 | Chandrasekhar | G06Q 20/06 |
| 2018/0089641 | A1* | 3/2018 | Chan | G06Q 40/06 |
| 2018/0218446 | A1* | 8/2018 | Ries | H04L 63/0884 |
| 2018/0276674 | A1* | 9/2018 | Ramatchandirane | G06Q 20/18 |
| 2019/0280875 | A1* | 9/2019 | Ragnoni | G06F 21/64 |
| 2019/0296915 | A1* | 9/2019 | Lancashire | H04L 9/3247 |
| 2020/0027084 | A1* | 1/2020 | Groarke | H04L 9/30 |
| 2020/0118096 | A1* | 4/2020 | Yang | H04L 9/3239 |
| 2020/0125391 | A1* | 4/2020 | Lee | G06Q 20/389 |
| 2020/0160326 | A1* | 5/2020 | Sarin | H04L 63/123 |
| 2020/0167773 | A1* | 5/2020 | Cervenka | G06Q 20/10 |
| 2020/0326973 | A1* | 10/2020 | Xie | G06Q 20/401 |
| 2021/0019740 | A1* | 1/2021 | Bhamidipati | G06F 9/5005 |
| 2021/0073913 | A1* | 3/2021 | Ingargiola | G06Q 20/02 |
| 2021/0182277 | A1* | 6/2021 | Carver | G06F 16/2379 |
| 2021/0232568 | A1* | 7/2021 | Yoon | G06F 16/27 |
| 2021/0256010 | A1* | 8/2021 | Sinclair | G06F 16/2379 |
| 2021/0263908 | A1* | 8/2021 | Saito | H04L 9/3239 |
| 2021/0312431 | A1* | 10/2021 | Ravinathan | G06Q 20/3829 |
| 2021/0334176 | A1* | 10/2021 | Sears | G06F 21/602 |
| 2022/0100733 | A1* | 3/2022 | Tock | H04L 9/3239 |
| 2022/0358119 | A1* | 11/2022 | Shao | G06F 16/2379 |
| 2022/0358223 | A1* | 11/2022 | Oh | G06F 21/64 |
| 2023/0004971 | A1* | 1/2023 | Rodriguez Bravo | H04L 63/1491 |
| 2023/0087602 | A1* | 3/2023 | De Caro | G06Q 20/065 705/64 |
| 2023/0177501 | A1* | 6/2023 | Coughlan | G06Q 20/3825 705/75 |
| 2023/0214792 | A1* | 7/2023 | Lee | G06Q 20/02 705/75 |

\* cited by examiner

METHOD AND SYSTEM FOR DYNAMIC ADDITION OF BLOCKS IN A BLOCKCHAIN

FIELD

The present disclosure relates to dynamic addition of new transactions and blocks in a blockchain, specifically the sorting of new transactions into groups and the selection thereof for new blocks based on associated criteria.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

Traditionally, all new transactions that are submitted are treated equally as all transactions are functionally the same, and so they are selected for confirmation and included in a new block in a first-come, first-served basis or randomly selected. In some instances, there may be variation as a result of mining fees offered by those who submit transactions, where a submitter that is willing to pay a higher fee may have their transaction taken earlier, as a blockchain miner may receive more money for their work.

However, there may be instances where a blockchain network may be interested in treating transactions differently. For example, some transactions may have a need for a higher priority in being added to a blockchain than others. Currently, blockchain networks lack such a functionality. Thus, there is a need for a technical system where a blockchain network is capable of controlling the order and priority for the inclusion of transactions in new blocks and the addition of such blocks to a blockchain.

SUMMARY

The present disclosure provides a description of systems and methods for dynamic selection of transactions for inclusion in new blocks added to a blockchain. As transactions are received in a blockchain network, they are sorted into groups using suitable criteria thereof, where the groups may be used for any purpose that may be beneficial for a blockchain network. When a new block is to be created, transactions may be selected for the new block based on predetermined criteria, which may control the order and number of transactions from each group. For example, transactions may be taken from the groups proportionally based on the number of transactions in each group, each block may rotate through the groups in which group they take transactions from, etc. After the transactions are selected, they are confirmed and then included in the new block, which is then distributed out to another nodes in the blockchain network for confirmation and addition to the blockchain. The result is that the order and priority of transactions can be adjusted through the use of predetermined criteria that is considered by blockchain nodes, and the sorting of transactions as they are received in the blockchain network, giving extra functionality to blockchain networks.

A method for dynamic selection of transactions for inclusion in new blocks added to a blockchain includes: receiving, by a receiver of a blockchain node in a blockchain network that manages a blockchain, a plurality of proposed transactions; sorting, by a processor of the blockchain node, each proposed transaction of the plurality of proposed transactions into one of a plurality of transaction groups; identifying, by the processor of the blockchain node, a selection of proposed transactions based on one or more dynamic selection criteria, where the selection of proposed transactions includes one or more proposed transactions from one or more of the plurality of transactions groups based on the one or more dynamic selection criteria; generating, by the processor of the blockchain node, a new block, where the new block includes a new block header and the proposed transactions in the identified selection of proposed transactions; and distributing, by a transmitter of the blockchain node, the generated new block to a plurality of additional nodes included in the blockchain network.

A system for dynamic selection of transactions for inclusion in new blocks added to a blockchain includes: a blockchain network that manages a blockchain; a plurality of additional nodes in the blockchain network; and a blockchain node in the blockchain network including a receiver receiving a plurality of proposed transactions, a processor sorting each proposed transaction of the plurality of proposed transactions into one of a plurality of transaction groups, identifying a selection of proposed transactions based on one or more dynamic selection criteria, where the selection of proposed transactions includes one or more proposed transactions from one or more of the plurality of transactions groups based on the one or more dynamic selection criteria, and generating a new block, where the new block includes a new block header and the proposed transactions in the identified selection of proposed transactions, and a transmitter distributing the generated new block to a plurality of additional nodes included in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain— A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Dynamic Selection of Blocks

Figure 1:
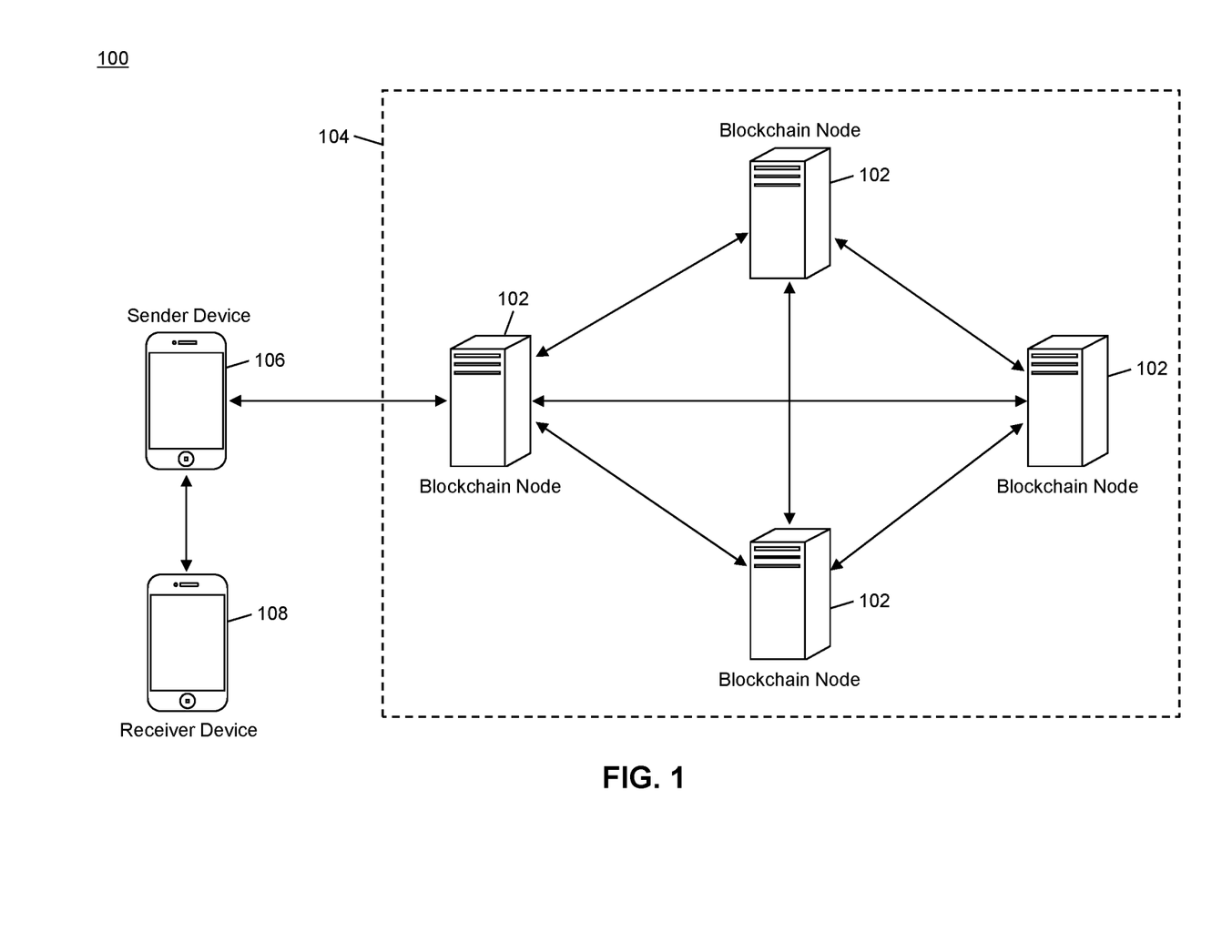
FIG. 1 is a block diagram illustrating a high level system architecture for dynamic selection of transactions in a blockchain network in accordance with exemplary embodiments.

FIG. 1 illustrates a system 100 for dynamically selecting proposed transactions for addition to new blocks in a blockchain based on transaction sorting and selection criteria.

Figure 2:
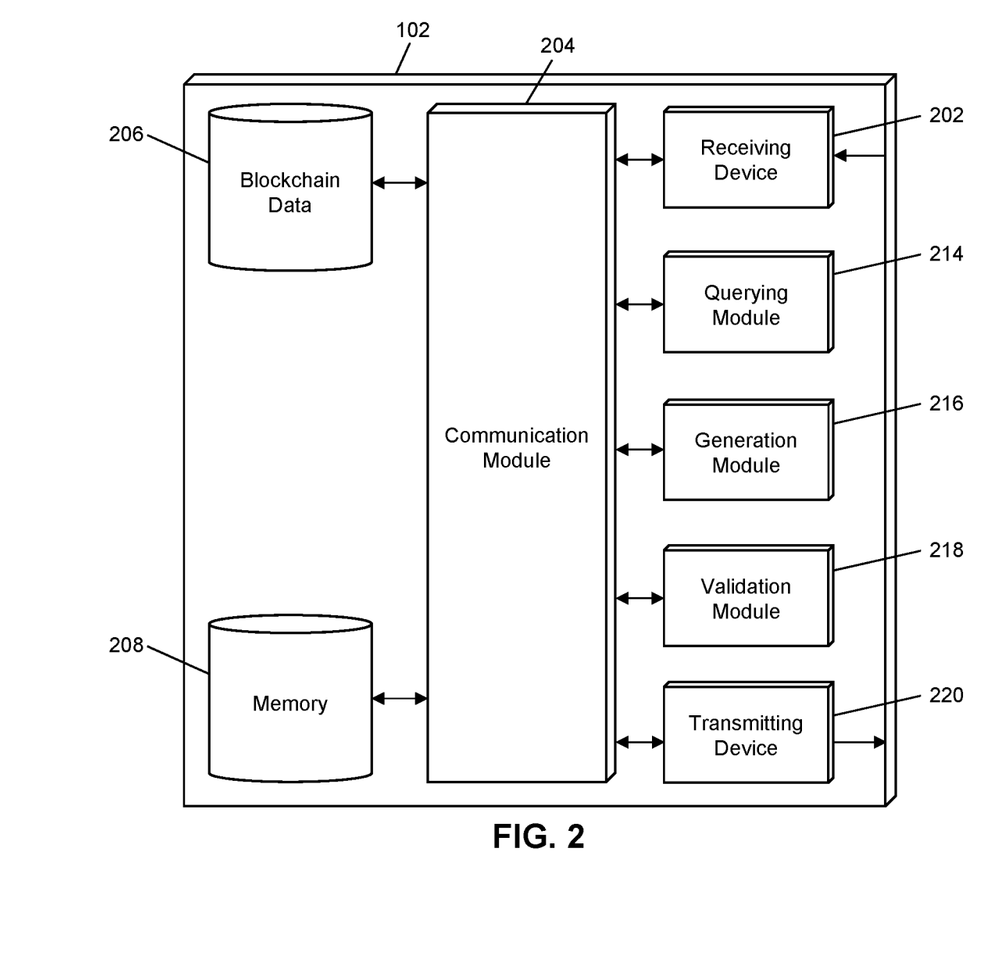
FIG. 2 is a block diagram illustrating a blockchain node of the system of FIG. 1 for dynamically selection of transactions in a blockchain network in accordance with exemplary embodiments.
Figure 5:
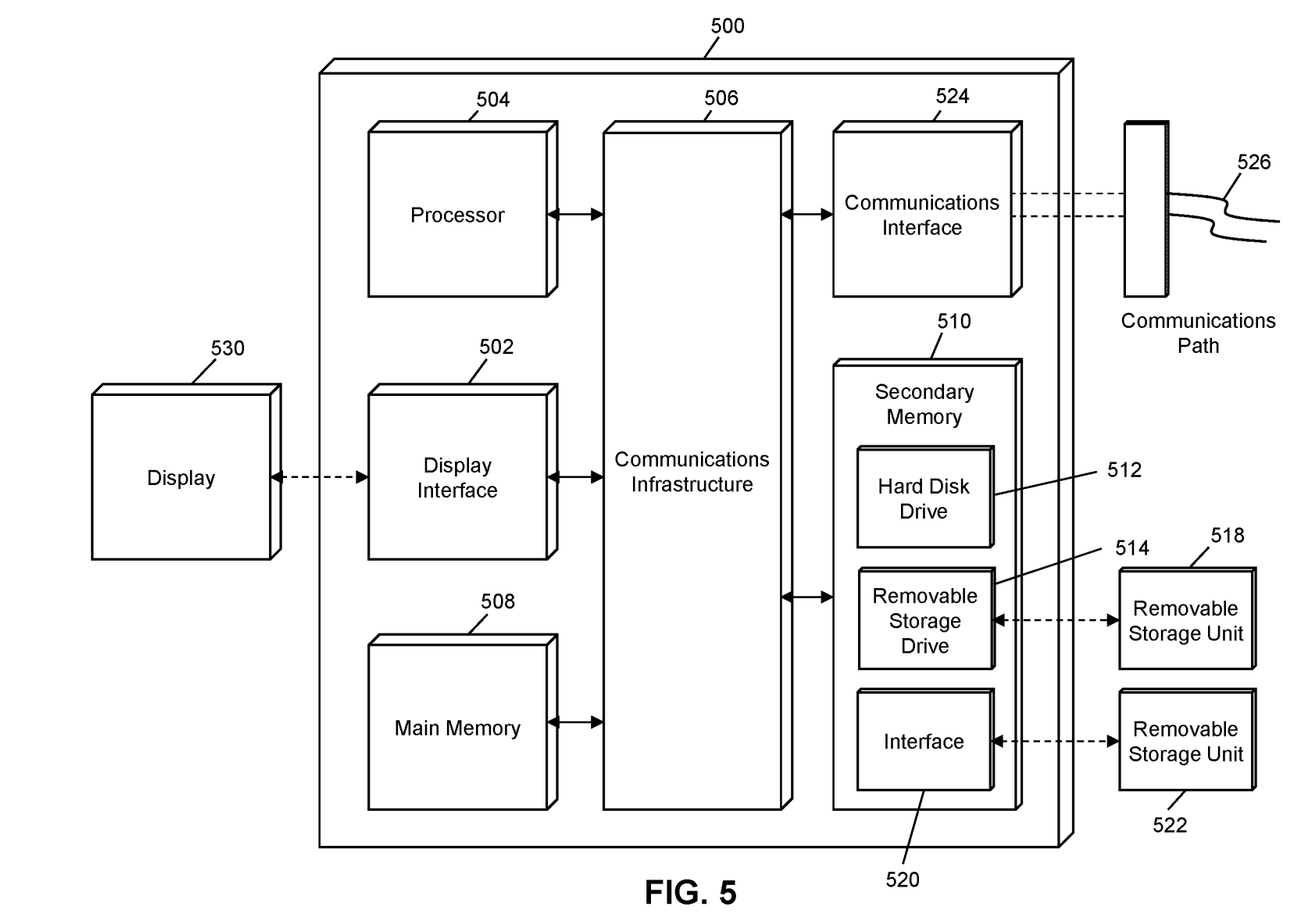
FIG. 5 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, new blockchain transactions that are submitted from sender devices 106 may be sorted by blockchain nodes 102 upon receipt. The blockchain network 104 may include a plurality of transaction groups, where blockchain transactions are sorted into the transaction groups based on associated criteria and data of the blockchain transactions themselves. For example, a blockchain network 104 may include two groups: one for pre-confirmed (pre-verified) transactions and another for transactions that have not been confirmed, where any time a transaction is confirmed but not included in a new block, the transaction may be moved to that transaction group. In another example, transactions may be sorted into groups based on the amount of cryptocurrency being transferred in the transaction. In yet another example, transactions may include additional data beyond included in standard transactions that can be used for sorting, such as industry data, merchant category codes, etc. In still another example, blockchain transactions may be sorted into transaction groups based on fees that the submitter is willing to pay.

Figure 3:
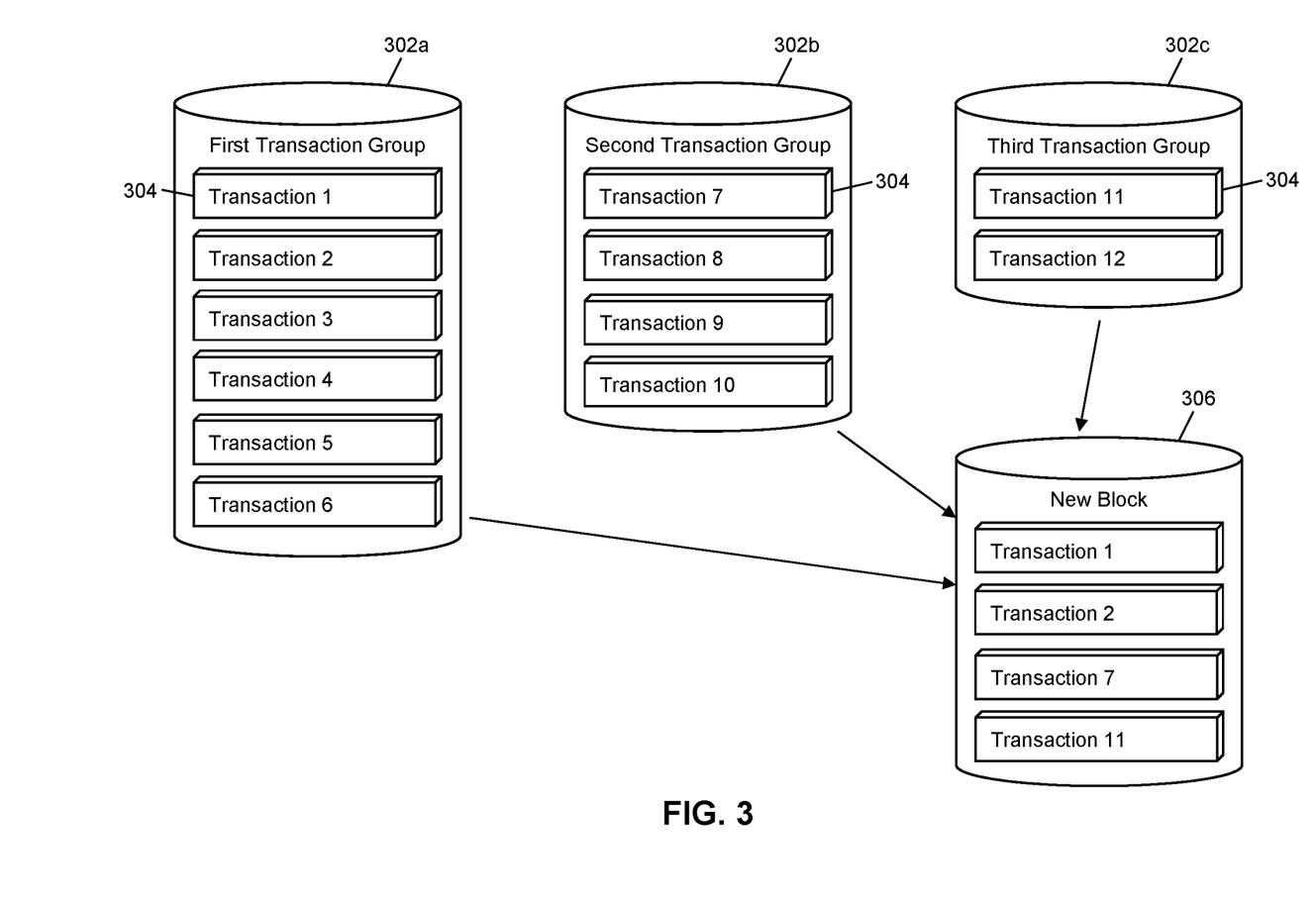
FIG. 3 is a diagram illustrating a dynamic selection of blockchain transactions for inclusion in a new block based on network traffic in accordance with exemplary embodiments.

When a blockchain node 102 is selecting transactions to include in a new block, the blockchain node 102 may select the transactions from the plurality of transaction groups according to one or more dynamic selection criteria. The dynamic selection criteria may vary based on the blockchain network 104 and the goals and functions thereof. In one example, transactions may be selected equally from each transaction group. In such an example, sender devices 106 may pay higher fees to be placed in other groups, where there may be less transactions in groups as the fees are higher, which, when transactions are taken from groups equally, may result in faster selection if a submitter pays a higher fee. In another example, transactions may be selected in an order that is based on a predetermined priority, such as five transactions from a first group for every one transaction from a second group. In some instances, such a priority may be dynamic based on the size of each transaction group. For example, as illustrated in FIG. 3 and discussed below, transactions may be selected proportionally from each transaction group based on a number of transactions in each transaction group, such as to reduce the size of transactions in each group at the same rate.

In some embodiments, each block may only have transactions from a single transaction group therein. In such embodiments, the number of blocks that include transactions from each transaction group may be the same or may vary, based on the dynamic selection criteria. For instance, in the second example above, there may be five blocks with transactions from a first group for every one block with transactions from a second group.

Once a blockchain node 102 has selected transactions, the blockchain node 102 may confirm any transactions that still await confirmation, as applicable (e.g., unless the transactions are selected from a group of pre-confirmed transactions). Confirmation of proposed blockchain transactions may include validating digital signatures, ensuring that unspent transaction outputs have not been previously spent, and verifying that the amount of currency being transferred is correct according to the unspent transaction outputs. Any confirmed transactions are then included in a new block that is generated by the blockchain node 102. The blockchain node 102 may include a new block and a plurality of blockchain data values, where each blockchain data value corresponds to one of the confirmed proposed transactions. The new block may then be distributed to other blockchain nodes 102 in the blockchain network 104, and confirmed thereby. Once the block has been confirmed, it may be added to the blockchain. In cases where a transaction has been confirmed but is not included in a new block (e.g., where a first blockchain node 102 may confirm the transaction while a second blockchain node 102 may mine the next block that is added to the blockchain without including the confirmed transaction), that transaction may be included in a transaction group for pre-confirmed transactions, if applicable.

In some embodiments, blockchain nodes 102 themselves may perform mining in accordance with the transaction groups. For instance, a first set of blockchain nodes 102 may only mine new blocks for transactions in a first transaction group, while a second set of blockchain nodes 102 may only mine new blocks for transactions in a second transaction group. In such embodiments, a new block may only be fully mined once the prior block has been added to the blockchain (e.g., due to having to generate a block reference value from the prior block), but the one set of blockchain nodes 102 may work on confirming the transactions from their transaction group and generate the data reference value while the other set of blockchain nodes 102 works on generating its new block, which may result in a more efficient blockchain.

The methods and systems discussed herein enable for greater flexibility in a blockchain network 104 by sorting proposed blockchain transactions into groups and having new blocks generated with transactions that are selected from the groups according to dynamic selection criteria. The greater flexibility and use of dynamic selection criteria enables a blockchain network 104 to provide prioritized transaction mining for fees, prioritize transactions by category or industry, balance transaction inclusion based on geographic location, etc. The greater flexibility can thus provide for greater efficiency and balancing of resources, thus improving the operation of the blockchain network 104 as a whole, and providing blockchain wallet operators with greater flexibility in how they submit their own blockchain transactions for inclusion in the blockchain.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, transaction group information, dynamic selection criteria, transaction group selections, sorting data, etc. The receiving device 202 may also be configured to receive data signals electronically transmitted by sender devices 106, which may be superimposed or otherwise encoded with new blockchain transactions, public keys, digital signatures, confirmation messages for precedence transactions, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, dynamic selection criteria, sorting criteria, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, fee data, dynamic selection criteria, sorting criteria, transaction group proposed transaction pools, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the blockchain data 206 to identify base values to be used in the modification of data values in a new blockchain transaction to be relative to a respective base value. The querying module 214 also be configured to sort received proposed blockchain transactions into transaction groups, such as by executing queries to store proposed blockchain transactions into transaction groups stored in the memory 208 of the blockchain node 102 as applicable based on sorting criteria, and to select proposed blockchain transactions from transaction groups based on dynamic selection criteria.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. The validation module 218 may also be configured to validate digital signatures using public keys and suitable signature generation algorithms.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, messages regarding transaction groups and sorting or selection criteria, transaction sorting data, and other data used in the operation and management of the blockchain. The transmitting device 220 may also be configured to electronically transmit data signals to sender devices 106, which may be superimposed or otherwise encoded with confirmation requests, notifications regarding transaction processing, etc.

Dynamic Selection of Proposed Blockchain Transactions

FIG. 3 illustrates the use of sorting criteria and dynamic selection criteria in the blockchain network 104 of the system 100 of FIG. 1 for the sorting of proposed blockchain transactions and the dynamic selection thereof for inclusion in a new blockchain.

In the illustrated example, blockchain nodes 102 in the blockchain network 104 may sort new proposed blockchain transactions 304 into three different transaction groups 302, transaction groups 302a, 302b, and 302c. In one example, the first transaction group 302a may include proposed blockchain transactions 304 that pay a 1% mining fee, the second transaction group 302b may include proposed blockchain transactions 304 that pay a 2% mining fee, and the third transaction group 302c may include proposed blockchain transactions 304 that pay a 3% mining fee. When a new proposed blockchain transaction 304 is received, the blockchain node 102 that receives the transaction may identify the mining fee that the sender device 106 (e.g., or other blockchain wallet, as appropriate) is willing to pay in the data included therein, and may sort the proposed blockchain transaction 304 into the requisite transaction group 302.

When a blockchain node 102 is ready to generate a new block 306, the blockchain node 102 may select proposed blockchain transactions 304 from the transaction groups 302 based on dynamic selection criteria. In the illustrated example, the blockchain node 102 may select proposed blockchain transactions 304 from each transaction group 302 proportionally based on the number of transactions in each transaction group 302. In the illustrated example, the new block 306 is to include four transactions, where the proportion of transactions from each transaction group 302 is based on the number of proposed blockchain transactions 304 in each group. In the example, the first transaction group 302a includes six transactions of the twelve total, 50%, and thus has two of the four transactions in the new block 306, also 50%. Keeping with the proportions, the blockchain node 102 selects one transaction from each of the transaction groups 302b and 302c.

Using such a dynamic selection criteria, proposed blockchain transactions 304 that are in the third transaction group 302c will be selected significantly faster than the proposed blockchain transactions in either of the other two transaction groups 302a and 302b, which may enable a sender device 106 to offer a higher mining fee for the faster selection.

Exemplary Method for Dynamic Selection of Transactions

Figure 4:
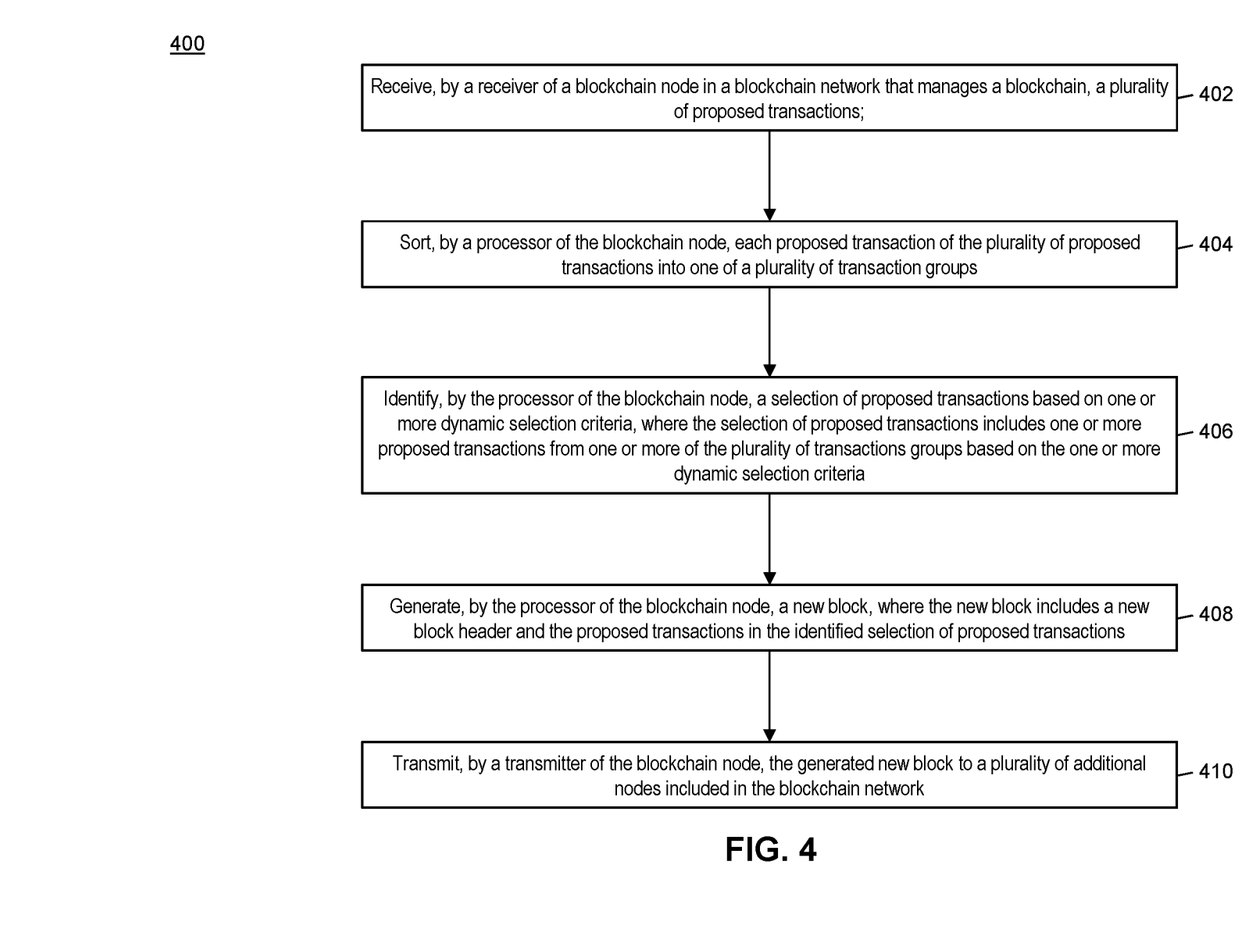
FIG. 4 is a flow chart illustrating an exemplary method for dynamic selection of transactions for inclusion in new blocks added to a blockchain in accordance with exemplary embodiments.

FIG. 4 illustrates a method 400 for the dynamic selection of proposed blockchain transactions for inclusion in a new block being added to a blockchain in a blockchain network using dynamic selection criteria and transaction sorting.

In step 402, a plurality of proposed transactions may be received by a receiver (e.g., receiving device 202) of a blockchain node (e.g., blockchain node 102) in a blockchain network (e.g., blockchain network 104) that manages a blockchain. In step 404, each proposed transaction may be sorted by a processor (e.g., querying module 214) of the blockchain node into one of a plurality of transaction groups.

In step 406, a selection of proposed transactions may be identified by the processor (e.g., querying module 214) based on one or more dynamic selection criteria, where the selection of proposed transactions includes one or more proposed transactions from one or more of the plurality of transactions groups based on the one or more dynamic selection criteria. In step 408, a new block may be generated by the processor (e.g., generation module 216) of the blockchain node, where the new block includes a new block header and the proposed transactions in the identified selection of proposed transactions. In step 410, the generated new block may be transmitted by a transmitter (e.g., the transmitting device 220) of the blockchain node to a plurality of additional nodes included in the blockchain network.

In one embodiment, the proposed transactions in the selection of proposed transactions may be from one transaction group of the plurality of transaction groups. In some embodiments, identification of a selection of proposed transactions, confirmation of proposed transactions in the selection of proposed transactions, generation of a new block, and distribution of the generated new block may be repeated by the blockchain node for a different selection of proposed transactions. In a further embodiment, each proposed transaction in the identified selection of proposed transactions may be from a first transaction group of the plurality of transactions groups, and each proposed transaction in the different selection of proposed transactions may be from a second transaction group of the plurality of transaction groups.

In one embodiment, the one or more dynamic selection criteria may be based on a number of proposed transactions in each of the plurality of transaction groups. In some embodiments, a number of proposed transactions included in the selection of proposed transactions from each of the plurality of transaction groups may be based on a total number of proposed transactions in each of the plurality of transaction groups. In one embodiment, the method 400 may further include confirming, by the processor of the blockchain node, the proposed transactions in the selection of proposed transactions prior to generating the new block. In some embodiments, one of the plurality of transactions groups may include pre-confirmed proposed transactions.

Computer System Architecture

FIG. 5 illustrates a computer system 500 in which embodiments of the present disclosure, or portions thereof, may be implemented as computer-readable code. For example, the blockchain nodes 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIG. 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIG. 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for dynamic selection of transactions for inclusion in new blocks added to a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for dynamic selection of blockchain transactions, the method comprising:
    receiving, by a receiver of a blockchain node in a blockchain network that manages a blockchain, a plurality of proposed new blockchain transactions;
    upon receipt of each proposed new blockchain transaction, sorting, by a processor of the blockchain node, each of the proposed new blockchain transactions into one of a plurality of blockchain transaction groups in the blockchain node based on (i) whether a blockchain transaction is a pre-confirmed transaction, (ii) whether the blockchain transaction is an unconfirmed transaction, (iii) an amount of cryptocurrency being transferred in the blockchain transaction, and (iv) fees that a submitter is willing to pay;
    subsequent to sorting each proposed new blockchain transaction of the plurality of proposed new blockchain transactions into one of the plurality of blockchain transaction groups, identifying, by the processor of the blockchain node, a selection of the proposed blockchain transactions from the plurality of blockchain transaction groups for inclusion in a new block of a blockchain in the blockchain network based on one or more dynamic selection criteria, wherein a number of the proposed blockchain transactions included in the selection of the proposed blockchain transactions in the new block of the blockchain is based on a total number of the proposed blockchain transactions in each of the plurality of blockchain transaction groups, and wherein the one or more dynamic selection criteria
        (i) are based on goals and functions of the blockchain network,
        (ii) are based on a number of the proposed blockchain transactions in each of the plurality of blockchain transaction groups, and
        (iii) control the order and number of transactions from each transaction group;
    in response to identifying the selection of the proposed blockchain transactions for inclusion in the new block of the blockchain in the blockchain network, confirming, by the blockchain node, any unconfirmed transaction that awaits confirmation by (i) validating digital signatures of payers of the unconfirmed transactions awaiting confirmation using a public key of a cryptographic key included in a blockchain wallet of the payer and (ii) ensuring that unspent transaction outputs associated with each payer have not been previously spent;
    generating, by the processor of the blockchain node, the new block, where the generated new block includes a new block header and the proposed blockchain transactions in the selection of the proposed blockchain transactions identified from the plurality of blockchain transaction groups; and distributing, by a transmitter of the blockchain node, the generated new block to a plurality of additional nodes included in the blockchain network.

2. The method of claim 1, wherein the proposed blockchain transactions in the selection of proposed blockchain transactions are from one blockchain transaction group of the plurality of blockchain transaction groups.

3. The method of claim 1, further comprising:

repeating, by the blockchain node, identification of a selection of proposed blockchain transactions, confirmation of proposed blockchain transactions in the selection of proposed blockchain transactions, generation of a new block, and distribution of the generated new block for a different selection of proposed blockchain transactions.

4. The method of claim 3, wherein each proposed blockchain transaction in the identified selection of proposed blockchain transactions is from one blockchain transaction group of the plurality of blockchain transactions groups, and each proposed blockchain transaction in the different selection of proposed blockchain transactions is from another blockchain transaction group of the plurality of blockchain transaction groups.

5. The method of claim 1, further comprising:

confirming, by the processor of the blockchain node, the proposed blockchain transactions in the selection of proposed blockchain transactions prior to generating the new block.

6. The method of claim 1, wherein one of the plurality of blockchain transactions groups includes pre-confirmed proposed blockchain transactions.

7. A system for dynamic selection of blockchain transactions, the system comprising:

a blockchain network that manages a blockchain;

a plurality of additional nodes in the blockchain network; and a blockchain node in the blockchain network including a receiver receiving a plurality of proposed new blockchain transactions, a processor upon receipt of each proposed new blockchain transaction, sorting the received proposed new blockchain transactions into one of a plurality of blockchain transaction groups in the blockchain node based on (i) whether a blockchain transaction is a pre-confirmed transaction, (ii) whether the blockchain transaction is an unconfirmed transaction, (iii) an amount of cryptocurrency being transferred in the blockchain transaction, and (iv) fees that a submitter is willing to pay, subsequent to sorting each proposed new blockchain transaction of the plurality of proposed new blockchain transactions into one of the plurality of blockchain transaction groups, identifying a selection of the proposed blockchain transactions from the plurality of blockchain transaction groups for inclusion in a new block of a blockchain in the blockchain network based on one or more dynamic selection criteria, wherein a number of the proposed blockchain transactions included in the selection of proposed blockchain transactions in the new block of the blockchain is based on a total number of the proposed blockchain transactions in each of the plurality of blockchain transaction groups, and wherein the one or more dynamic selection criteria (i) are based on goals and functions of the blockchain network, (ii) are based on a number of the proposed blockchain transactions in each of the plurality of blockchain transaction groups, and (iii) control the order and number of transactions from each transaction group, confirming, in response to identifying the selection of proposed blockchain transactions for inclusion in the new block of the blockchain in the blockchain network, any unconfirmed blockchain transaction that awaits confirmation by (i) validating digital signatures of payers of the unconfirmed blockchain transactions awaiting confirmation using a public key of a cryptographic key included in a blockchain wallet of the payer and (ii) ensuring that unspent transaction outputs associated with each payer have not been previously spent, and generating the new block, where the generated new block includes a new block header and the proposed blockchain transactions in the selection of proposed blockchain transactions identified from the plurality of blockchain transaction groups, and a transmitter distributing the generated new block to a plurality of additional nodes included in the blockchain network.

8. The system of claim 7, wherein the proposed blockchain transactions in the selection of proposed blockchain transactions are from one blockchain transaction group of the plurality of blockchain transaction groups.

9. The system of claim 7, wherein the blockchain node repeats identification of a selection of proposed blockchain transactions, confirmation of proposed blockchain transactions in the selection of proposed blockchain transactions, generation of a new block, and distribution of the generated new block for a different selection of proposed blockchain transactions.

10. The system of claim 9, wherein each proposed blockchain transaction in the identified selection of proposed blockchain transactions is from one blockchain transaction group of the plurality of blockchain transactions groups, and each proposed blockchain transaction in the different selection of proposed blockchain transactions is from another transaction group of the plurality of blockchain transaction groups.

11. The system of claim 7, wherein the processor of the blockchain node confirms the proposed blockchain transactions in the selection of proposed blockchain transactions prior to generating the new block.

12. The system of claim 7, wherein one of the plurality of blockchain transactions groups includes pre-confirmed proposed blockchain transactions.

* * * * *